(12) United States Patent
Li et al.

(10) Patent No.: US 9,250,511 B2
(45) Date of Patent: Feb. 2, 2016

(54) SHAPE-RESTORING DEVICE AND A RESTORING METHOD FOR DISTORTED FILMSTRIPS

(75) Inventors: Yuhu Li, Xi'an (CN); Yajun Zhou, Xi'an (CN); Jing Cao, Xi'an (CN)

(73) Assignee: SHAANXI NORMAL UNIVERSITY, Xi'an, Shaanxi (CN)

( * ) Notice: Subject to any disclaimer, the term of this patent is extended or adjusted under 35 U.S.C. 154(b) by 626 days.

(21) Appl. No.: 13/491,173

(22) Filed: Jun. 7, 2012

(65) Prior Publication Data

US 2012/0313273 A1   Dec. 13, 2012

(30) Foreign Application Priority Data

Jun. 9, 2011   (CN) .......................... 2011 1 0155006

(51) Int. Cl.
| | |
|---|---|
| *G03C 11/00* | (2006.01) |
| *B29C 53/18* | (2006.01) |
| *B29C 73/30* | (2006.01) |
| *G03C 11/06* | (2006.01) |
| *G03D 15/08* | (2006.01) |
| *B30B 15/06* | (2006.01) |

(52) U.S. Cl.
CPC ................ *G03C 11/00* (2013.01); *B29C 53/18* (2013.01); *B29C 73/30* (2013.01); *B30B 15/064* (2013.01); *B65H 2301/51232* (2013.01); *B65H 2301/51432* (2013.01); *G03C 11/06* (2013.01); *G03D 15/08* (2013.01)

(58) Field of Classification Search
CPC ...... G03C 11/00; G03C 11/005; G03C 11/06; G03D 15/00; G03D 15/006; G03D 15/08; B29C 33/202; B29C 53/00; B29C 53/16; B29C 53/18; B29C 66/344; B29C 71/02; B29C 73/30; B29C 73/34; B65H 2301/51232; B65H 2301/51432; B30B 1/34; B30B 1/36; B30B 15/06; B30B 15/064; B30B 15/062
See application file for complete search history.

(56) References Cited

U.S. PATENT DOCUMENTS

| | | | | |
|---|---|---|---|---|
| 3,996,328 | A | * | 12/1976 | Coffin .................... B29C 59/02 264/280 |
| 5,406,352 | A | * | 4/1995 | Kralles .............. G03B 27/6285 355/72 |
| 6,024,820 | A | * | 2/2000 | Ozawa ................... B29C 63/02 156/212 |

* cited by examiner

*Primary Examiner* — Alison Hindenlang
*Assistant Examiner* — Hannuri L Kwon
(74) *Attorney, Agent, or Firm* — Hanley, Flight & Zimmerman, LLC

(57) ABSTRACT

A shape-restoring device and a restoring method for distorted filmstrips are proposed for restoring filmstrips that are distorted due to vinegar syndrome. During the implementation of the method, the air compressor is started such that pressure reaches 0.6-0.9 MPa; three-way valves are regulated so as to introduce pressure into film-clasping cylinders and pressing-plate cylinders via diverter valves; the cylinder spindles of the film-clasping cylinders move the upper collets fixedly connected therewith, for fixing filmstrips; the cylinder spindles of the pressing-plate cylinders move the pressing plate fixedly connected therewith such that the binding underlay on the lower surface of the pressing plate contacts the heating plate; in this way, pressuring, heating and restoring are carried out. Through steps of pressing, heating, fixing filmstrips, shape-restoring and transporting the distorted filmstrips under the pressure of 0.5-0.8 MPa and the temperature of 80-90° C. for 50-80 s, the distorted filmstrips can be restored segment by segment.

5 Claims, 1 Drawing Sheet

SHAPE-RESTORING DEVICE AND A RESTORING METHOD FOR DISTORTED FILMSTRIPS

RELATED APPLICATION

This patent claims priority to Chinese Patent Application 201110155006.2, filed on Jun. 9, 2011, which is hereby incorporated herein by reference in entirety.

BACKGROUND OF THE INVENTION

1. Field of the Invention

The invention relates to the field of protecting and restoring documents, and specifically, to technology for shape-restoring filmstrips that are distorted due to vinegar syndrome, and more particularly, the invention relates to a shape-restoring device and a restoring method for distorted filmstrips.

2. Background Information

As a great invention even in the technological history, filmstrips convey artistic essence and historical documentaries, and therefore are special and irreplaceable cultural relics. Vinegar syndrome results from degradation of the base material of filmstrips, i.e., cellulose triacetate, which subjects to high temperature, high moisture, and other hash environmental factors in the storage environment. There are no practical ways of halting the course of degradation, and therefore vinegar syndrome is deemed as the cancer of film industry. At present, precautions are taken to improve storage environment to preserve filmstrips. The onset of vinegar syndrome is indicated by acidic smell released from filmstrips. As the acidic smell becomes strong, plasticizer of the film base is precipitated and film base is softened. Hence, colorful images begin to fade and black-and-white images tarnish. As the course processes, crystalloid appears on the film base, film base becomes distorted, and emulsion becomes tacky. At last black tacky glue solution is released from filmstrips and filmstrips are self-destroyed. Occurrence of vinegar syndrome leads to degradation of recorded images, breakage of mechanical strength and destroy of filmstrip size, which distort the filmstrips. In this way, filmstrips cannot be projected, cannot be digitized, nor can they be restored via digital means.

SUMMARY OF THE INVENTION

In order to solve problems associated with filmstrips distorted due to vinegar syndrome that these filmstrips cannot be projected, digitized, nor restored through digital means, which usually arise in the field of documentary protecting and storing, the invention proposes a shape-restoring device and a restoring method for distorted filmstrips.

The invention comprises a bracket, a first pressing-plate cylinder, a second pressing-plate cylinder, a pressing plate, a heating panel, a heating resistor, a temperature sensor, a film-unwinding reel, a film-winding reel, a base, a hanging rack, a bottom plate, a first film-clasping cylinder, and a second film-clasping cylinder, wherein:

the bracket is fixed on the upper surface of the base so as to form a frame structure; the first pressing-plate cylinder and the second pressing-plate cylinder are installed on the crossbeam of the bracket; the cylinder spindles of the first pressing-plate cylinder and of the second pressing-plate cylinder passes through the crossbeam and are fixedly connected to the connecting rods of the hanging rack in the frame constituted by the bracket and the base; the heating panel and the pressing plate are located within the frame constituted by the bracket and the base, and the heating panel is installed on the upper surface of the base; the pressing plate is fixed on the lower surface of the hanging rack; the pressing plate is designed with a binding underlay on the lower surface thereof; the upper surface of the pressing plate is fixed with a limiting sleeve on each side thereof, respectively; a positioning spindle is fixed to the crossbeam of the bracket at one end thereof, and the other end thereof is telescoped within the limiting sleeve; and the film-unwinding reel is located on one side of the base and the film-winding reel is located on the other side of the base.

The first film-clasping cylinder and the second film-clasping cylinder are fixed to the outer surfaces of the end wall plates of the bracket respectively. The spindles of the first film-clasping cylinder and of the second film-clasping cylinder are connected with upper collets, which correspond, in terms of locations, to the lower collets that are fixed beneath the first film-clasping cylinder and the second film-clasping cylinder. The surfaces of the upper collets and of the lower collets are arcs that match with each other. The surfaces of both lower collets in height are located in the same plane as the upper surface of the heating panel.

The heating panel is provided with installing grooves for heating resistors, and 12 heating resistors are uniformly distributed on the lower surface of the heating panel. Every 4 heating resistors are connected to a temperature sensor. A bottom plate is sandwiched between the heating panel and the base.

The base is fixed with a supporting plate on each side of the upper surface thereof. The film-unwinding reel and the film-winding reel are fixed on the lower surface of the supporting plate respectively. The two upper collets are also fixed on the upper surface of the supporting plate.

The two positioning spindles are respectively provided with a limiting bar on the inner side thereof. The first pressing-plate cylinder and the second pressing-plate cylinder are respectively located on the inner side of the corresponding limiting bar. The bracket is fixed with installing plates respectively for the first film-clasping cylinder and the second film-clasping cylinder on the outer surfaces of the end wall plates thereof.

The air compressor is connected with a first three-way valve, a second three-way valve and a third three-way valve. Two ports of the first three-way valve are connected to a first diverter valve and a second diverter valve, respectively. Two ports of the first diverter valve are connected to upper inlets of the first pressing-plate cylinder and of the second pressing-plate cylinder, respectively. Two ports of the second diverter valve are connected to lower inlets of the first pressing-plate cylinder 3 and of the second pressing-plate cylinder 4, respectively. Two ports of the second three-way valve are connected to the upper and lower inlets of the first film-clasping cylinder, respectively. Two ports of the third three-way valve are connected to the upper and the lower inlets of the second film-clasping cylinder, respectively.

The invention also disclose a shape-restoring method for distorted filmstrips, characterized in that, it comprises the following:

Step 1: pressuring. The air compressor is started, and the diverter valves are pressured to 0.1-1.2 MPa.

Step 2: heating. The heating panel is heated by the heating resistors to 80-90° C., and is maintained at this temperature.

Step 3: fixing filmstrips. The distorted filmstrip is located on the film-unwinding reel at one side of the shape-restoring device for distorted filmstrips, and a segment of the distorted filmstrip is placed on the heating panel. The ports of the second three-way valve and of the third three-way valve that are connected to upper inlets of the first film-clasping cylinder and of the second film-clasping cylinder are opened, such that pressure is introduced into the first film-clasping cylinder and second film-clasping cylinder. Hence, the first film-clasping cylinder and the second film-clasping cylinder generate a downward pressure. Under the action of the downward pressure, the first film-clasping cylinder and the second film-clasping cylinder move the upper collets fixedly connected therewith downwards, such that the upper collets engage with the lower collets and the filmstrip is tightly fixed.

Step 4: shape-restoring distorted filmstrips. The first diverter valve is opened, such that pressure is introduced into the first pressing-plate cylinder and second pressing-plate cylinder while passing through the first diverter valve, such that the first pressing-plate cylinder and second pressing-plate cylinder simultaneously generate a downward pressure. Under the action of the downward pressure, the cylinder spindles of the first pressing-plate cylinder and of the second pressing-plate cylinder move the pressing plate fixedly connected therewith downwards, such that the binding underlay on the lower surface of the pressing plate closely contacts the heating panel. Hence the distorted filmstrip is pressured and heated, and therefore is restored. Shape-restoring is performed at the temperature of 80-90° C. and the pressure of 0.5-0.8 MPa. The time for restoring lasts 50-80 s. In this way a well restored filmstrip segment would result.

Step 5: transporting filmstrips. Upon finishing resorting, the first diverter valve is closed and the second diverter valve is opened, such that pressure is introduced into the first pressing-plate cylinder and the second pressing-plate cylinder while passing through the second diverter valve. Hence the first pressing-plate cylinder and the second pressing-plate cylinder generate an upward pressure simultaneously. Under the action of the upward pressure, the cylinder spindles of the first pressing-plate cylinder and of second pressing-plate cylinder move the pressing plate fixedly connected therewith upwards, such that the binding underlay on the lower surface of the pressing plate disengages with the heating panel. The ports of the second three-way valve and of the third three-way valve that are connected with the lower inlets of the first film-clasping cylinder and of the second film-clasping cylinder are opened, such that pressure is introduced into the first film-clasping cylinder and the second film-clasping cylinder. In this way, the first film-clasping cylinder and the second film-clasping cylinder generate an upward pressure simultaneously. Under the action of the upward pressure, the cylinder spindles of the first film-clasping cylinder and the second film-clasping cylinder move the upper collets fixedly connected therewith upwards, such that the upper collets and the lower collets 6 disengage with each other. The restored filmstrip segment is retracted to the film-winding reel, and then another filmstrip segment to be restored is located on the heating panel.

Step 6: shape-restoring filmstrips segment by segment. Steps 3 to 5 are repeated, and the distorted filmstrips are restored segment by segment. Finally well restored filmstrips would result.

When fixing the filmstrip, the port of the second three-way valve that is connected with the upper inlet of the first film-clasping cylinder is opened, and the first film-clasping cylinder is started so as to tightly fix one end of the filmstrip first and then tense the filmstrip; and then the port of the third three-way valve that is connected with the upper inlet of the second film-clasping cylinder is opened, and the second film-clasping cylinder is started so as to tightly fix the other end of the filmstrip.

To realize the effect of the invention, the treatment process is optimized through tests. The results of the tests are shown as follows.

(1) Determination of Temperature

TABLE 1 effects of temperature on shape-restoring of distorted filmstrips

| Temperature/ ° C. | Pressure/ MPa | Time/ min | Shape-restoring effect on distorted filmstrips |
|---|---|---|---|
| 50 | 0.6 | 2 | no visible effect |
| 60 | 0.6 | 2 | distortion reduced, but not fully flat |
| 70 | 0.6 | 2 | substantially flat, with wrinkles at the perforations |
| 75 | 0.6 | 2 | Substantially flat, with wrinkles at the perforations |
| 80 | 0.6 | 2 | flat |
| 85 | 0.6 | 2 | flat |
| 90 | 0.6 | 2 | flat |
| 95 | 0.6 | 2 | flat |
| 100 | 0.6 | 2 | flat, with emulsion layer rupturing |

(2) Determination of Pressure

TABLE 2 effects of pressure on shape-restoring of distorted filmstrips

| Temperature/ ° C. | Pressure/ MPa | Time/ min | Shape-restoring effect on distorted filmstrips |
|---|---|---|---|
| 80 | 0.1 | 2 | distortion reduced, but not fully flat |
| 80 | 0.2 | 2 | distortion reduced, but not fully flat |
| 80 | 0.3 | 2 | substantially flat, with wrinkles at the perforation |
| 80 | 0.4 | 2 | substantially flat, with wrinkles at the perforation |
| 80 | 0.5 | 2 | flat |
| 80 | 0.6 | 2 | flat |

(3) Determination of Time

TABLE 3 effects of time on shape-restoring of distorted filmstrips

| Temperature/ ° C. | Pressure/ MPa | Time/s | Shape-restoring effect on distorted filmstrips |
|---|---|---|---|
| 80 | 0.5 | 10 | distortion reduced, but not fully flat |
| 80 | 0.5 | 20 | distortion reduced, but not fully flat |
| 80 | 0.5 | 30 | substantially flat, with wrinkles at the perforations |
| 80 | 0.5 | 40 | substantially flat, with wrinkles at the perforations |
| 80 | 0.5 | 50 | flat |
| 80 | 0.5 | 60 | flat |

The shape-restoring device and method for distorted filmstrips disclosed according to the invention are convenient to perform, and can result in excellent restoring effect. The inventive device and method are a new restoring means and process to quickly restore filmstrips that have been distorted due to vinegar syndrome. The invention employs semi-automatic control such that the treatment process becomes less complicated and damage that would otherwise results from manual manipulation is restrained. Hence, the restoring effect is enhanced, the restoring time is reduced and the restoring efficiency is improved.

To manifest the effects of the invention, the inventor conducts the following tests, in which folding endurance, tensile strength and tear resistance are measured for distorted and restored filmstrips so as to evaluate filmstrip endurance. The tests are carried out in accordance with international standards GB/T453-2002 (in terms of tensile strength, that is, the method of loading at a constant rate), GB/T2679.5-1995 (in terms of folding endurance, that is, MIT folding endurance method), and GB/T455-2002 (in terms of tear resistance).

Three different filmstrips made of cellulose triacetate are prepared, and are treated by the process of the inventive device and method at the temperature of 80° C. and subject to the pressure of 0.5 MPa for 60 s so as to restore shape. The treated filmstrips are subject to the mechanical tests two days later after the process is finished.

The tensile strength test is carried out at the temperature of 23±3° C. and humidity of greater than 50% RH. The filmstrips made of cellulose triacetate to be measured are cut into pieces in size of 150×5 mm. The equipment J-KZ100 (a tensile testing machine of pendulum type) is employed to measure the tensile strength of the samples. Values of 10 independent samples in each group are averaged to yield average tension. And the tensile strength is calculated according to the formula:

$$S = \frac{F}{L_w}$$

wherein S denotes the tensile strength (KN/m), F denotes the average tension (N), and $L_w$ denotes the width of the sample (mm).

The folding endurance test is carried out at the temperature of 23±3° C. and humidity of greater than 50% RH. The filmstrips made of cellulose triacetate to be measured are cut into pieces in size of 150×15 mm. The equipment DC-MIT135B (a folding endurance testing machine) is employed to measure the tensile strength. 10 samples from each group are independently measured at the folding force of 4.9 N. The average value of double-folding times is taken for comparison, which is shown in Table 4.

TABLE 4

| effects of mechanical strength on the shape-restoring process | | | | | |
|---|---|---|---|---|---|
| I | | II | | III | |
| untreated | treated | untreated | treated | untreated | treated |
| Tensile strength (kN/m) 13.6 | 13.6 | 14.2 | 14.2 | 13.8 | 13.8 |
| Folding endurance (double-folding times) 16 | 16 | 18 | 18 | 18 | 18 |

As can be seen from Table 4, the shape-restoring method has no negative effect on the mechanical properties of the filmstrips.

Figure 1:
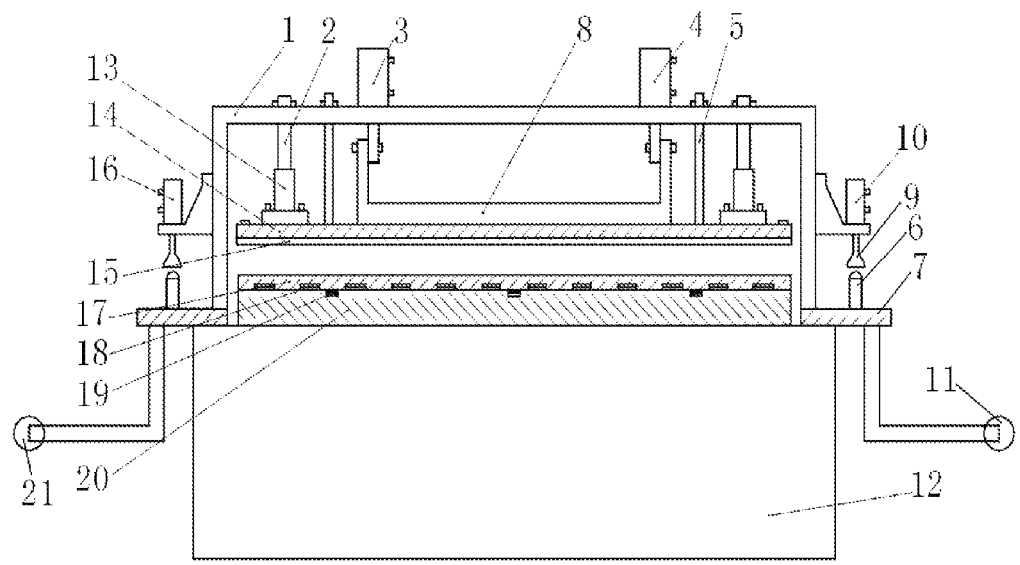
FIG. 1 illustratively shows the structural view of the shape-restoring device for distorted filmstrips.

The reference numbers are defined as follows:
1 bracket
2 positioning spindle
3 first pressing-plate cylinder
4 second pressing-plate cylinder
5 limiting bar
6 lower collet
7 supporting plate
8 hanging rack
9 upper collet
10 second film-clasping cylinder
11 film-unwinding reel
12 base
13 limiting sleeve
14 pressing plate
15 binding underlay
16 first film-clasping cylinder
17 heating panel
18 heating resistor
19 temperature sensor
20 bottom plate
21 film-winding reel

DETAILED DESCRIPTION OF AN ILLUSTRATIVE EMBODIMENT

Embodiment 1

This embodiment discloses a shape-restoring device for distorted filmstrips for restoring filmstrips that are distorted due to vinegar syndrome.

The device in this embodiment comprises a first pressing-plate cylinder 3, a second pressing-plate cylinder 4, a pressing plate 14, a heating panel 17, a heating resistor 18, a temperature sensor 19, a film-unwinding reel 11, a film-winding reel 21, a base 12, a hanging rack 8, a bottom plate 20, a first film-clasping cylinder 16 and a second film-clasping cylinder 10, wherein the bracket 1 is fixed on the upper surface of the base 12 so as to form a frame structure. The first pressing-plate cylinder 3 and the second pressing-plate cylinder 4 are installed on the crossbeam of the bracket 1. The cylinder spindles of the first pressing-plate cylinder 3 and the second pressing-plate cylinder 4 pass through the crossbeam and are fixedly connected to the connecting rods of the hanging rack 8 in the frame constituted by the bracket 1 and the base 12.

The heating panel 17 and the pressing plate 14 are located within the frame constituted by the bracket 1 and the base 12, and the heating panel 17 is installed onto the upper surface of the base 12. The pressing plate 14 is fixed onto the lower surface of the hanging rack 8. The pressing plate 14 is designed with a binding underlay 15 on the lower surface thereof. The upper surface of the pressing plate 14 is fixed with a limiting sleeve 13 on each side thereof, respectively. The positioning spindle 2 is fixed to the crossbeam of the bracket 1 at one end thereof, and the other end thereof is telescoped within the limiting sleeve. The film-unwinding reel 11 is located on one side of the base and the film-winding reel 12 is located on the other side of the base 12, respectively.

The first film-clasping cylinder 16 and the second film-clasping cylinder 10 are fixed to the outer surfaces of the end wall plates of the bracket 1. The spindles of the first film-clasping cylinder 16 and the second film-clasping cylinder 10 are connected with upper collets 9, which correspond, in terms of locations, to the lower collets 6 that are fixed beneath the first film-clasping cylinder 16 and the second film-clasping cylinder 10. The surfaces of the upper collets 9 and the lower collets 6 are arcs that match with each other. The surfaces of both lower collets 6 in height are located in the same plane as the upper surface of the heating panel 17. The cylinders employed herein are double-acting cylinders, with operating pressure ranging from 0.1 to 0.9 MPa.

The heating panel 17 is designed uniformly with the installing grooves for heating resistors 18 on the lower surface thereof, such that 12 heating resistors 18 are uniformly distributed on the lower surface of the heating panel 17. Every four heating resistors are connected to one temperature sensor 19.

The bracket 1 is a frame structure in a form of a "door". The crossbeam of the bracket 1 is designed with an installing hole for the positioning spindle 2 on each side thereof. The two positioning spindles 2 pass through the two installing holes, respectively, and are fixed in the bracket 1. Installing holes for the limiting bars 5 are provided to the inner sides of the installing holes for the positioning spindle 2. The two limiting bars 5 pass through the installing holes, and are slidely engaged with the limiting sleeves 13, respectively. The installing holes for the first pressing-plate cylinder 3 and for the second pressing-plate cylinder 4 are provided to the inner sides of the installing holes for the limiting bars. The first pressing-plate cylinder 3 and the second pressing-plate cylinder 4 are installed on the crossbeam of the bracket 1. The spindles of the cylinders both pass through the installing holes, and are fixedly connected to the connecting rods of the hanging rack 8 in the bracket 1. The end wall plates of the bracket 1 are fixed with the installing plates for the first film-clasping cylinder 16 and the second film-clasping cylinder 10 on the outer surfaces thereof. The first film-clasping cylinder 16 and the second film-clasping cylinder 10 are installed on the installing plates, respectively. The cylinder spindles of the first film-clasping cylinder 16 and of the second film-clasping cylinder 10 are fixed with the upper collets 9, respectively. The surfaces of the upper collets 9 and the lower collets 6 are arc surfaces that match with each other.

The base 12 is a platform to carry the shape-restoring device for distorted filmstrips. The bracket 1 is fixed on the upper surface of the base 12. The bottom plate 20 is located on the upper surface of the base 12. The heating panel 17 is located on the upper surface of the bottom plate 20. The base 12 is fixed with a supporting plate 7 on each side of the upper surface thereof. The supporting plate 7 is fixed with the lower collets 6 on the upper surface thereof. The positions of the upper collets 9 correspond to the positions of the lower collets 6. The surfaces of the upper collets 9 and the lower collets 6 are arcs that match with each other. The surfaces of both lower collets 6 in height are located in the same plane as the upper surface of the heating panel 17.

The supporting plate 7 on one side is fixed with an installing bracket for the film-unwinding reel 11 on the lower surface thereof, and the supporting plate 7 on the other side is fixed with an installing bracket for the film-winding reel 21 on the lower surface thereof.

The heating panel 17 is a plate that is made of aluminum alloy. The heating panel 17 is provided uniformly with installing grooves for 12 heating resistor 18 on the lower surface thereof. A bottom plate 20 is sandwiched between the heating panel 17 and the base 12.

In the embodiment, the heating resistor 18 is a heating flake made of alumina ceramic, the heating density of which is 30 $W/cm^2$.

Figure 2:
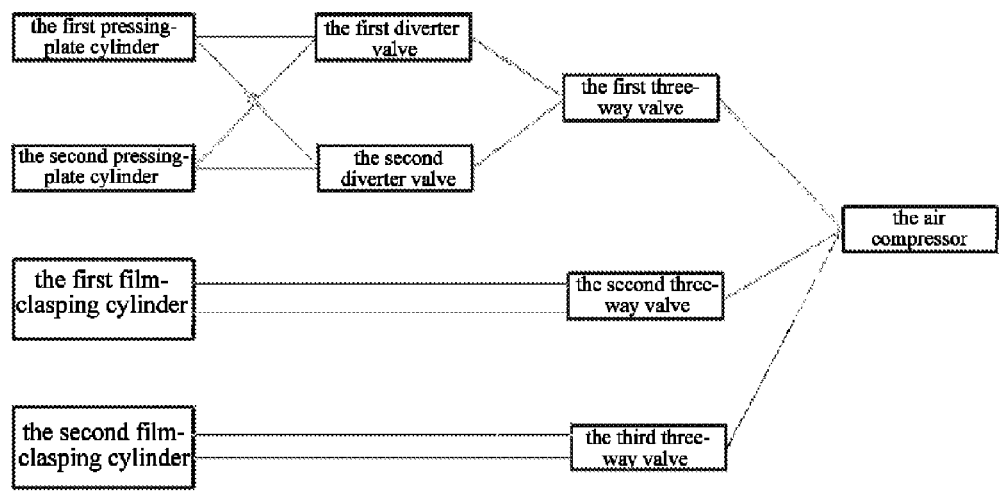
FIG. 2 illustratively shows the pneumatic layout of the shape-restoring device for distorted filmstrips.

The pneumatic layout in the embodiment is shown in FIG. 2. The air compressor is connected with a first three-way valve, a second three-way valve and a third three-way valve. Two ports of the first three-way valve are connected to a first diverter valve and a second diverter valve, respectively. Two ports of the first diverter valve are connected to upper inlets of the first pressing-plate cylinder 3 and the second pressing-plate cylinder 4, respectively. Two ports of the second diverter valve are connected to lower inlets of the first pressing-plate cylinder 3 and the second pressing-plate cylinder 4, respectively. Two ports of the second three-way valve are connected to the upper inlet and the lower inlet of the first film-clasping cylinder 16, respectively. Two ports of the third three-way valve are connected to the upper inlet and the lower inlet of the second film-clasping cylinder 10, respectively.

During operation, the air compressor is started and thus created air pressure is transmitted to the first three-way valve, the second three-way valve and the third three-way valve simultaneously. The pressure transmitted to the first three-way valve is conducted into the first diverter valve, and is conducted to the first pressing-plate cylinder 3 and the second pressing-plate cylinder 4 via the first diverter valve, such that the first pressing-plate cylinder 3 and the second pressing-plate cylinder 4 generate downward pressure simultaneously. Under the action of the downward pressure, the cylinder spindles of the first pressing-plate cylinder 3 and second pressing-plate cylinder 4 move the pressing plate 14 fixedly connected therewith downwards, such that the pressing plate 14 engages with the heating panel 17. Upon completion of pressuring the filmstrips, the first diverter valve is closed and pressure is conducted into the second diverter valve, and is simultaneously conducted to the first pressing-plate cylinder 3 and second pressing-plate cylinder 4 via the second diverter valve. In this way the first pressing-plate cylinder 3 and the second pressing-plate cylinder 4 simultaneously generate an upward pressure. Under the action of the upward pressure, the cylinder spindles of the first pressing-plate cylinder 3 and of the second pressing-plate cylinder 4 move the pressing plate 14 fixedly connected therewith upwards, such that the pressing plate 14 disengages with the heating panel 17.

Pressure conducted into the second three-way valve and the third three-way valve is first transmitted into the upper inlets of the first film-clasping cylinder 16 and of the second film-clasping cylinder 10, such that the first film-clasping cylinder 16 and the second film-clasping cylinder 10 simultaneously generate a downward pressure. Under the action of the downward pressure, the cylinder spindles of the first film-clasping cylinder 16 and of the second film-clasping cylinder 10 move the upper collets 9 fixedly connected therewith downwards, such that the upper collets 9 engage with the lower collets 6 and the filmstrip is tightly fixed. Upon the completion of pressuring the filmstrip, the ports of the second three-way valve and of the third three-way valve that are connected with the upper inlets of the first film-clasping cylinder 16 and of the second film-clasping cylinder 10 are closed, and the ports of the second three-way valve and of the third three-way valve that are connected with the lower inlets of the first film-clasping cylinder 16 and of the second film-clasping cylinder 10 are opened, such that the first film-clasping cylinder 16 and the second film-clasping cylinder 10 simultaneously generate upward pressure. Under the action of the upward pressure, the cylinder spindles of the first film-clasping cylinder 16 and of the second film-clasping cylinder 10 move the upper collets 9 fixedly connected therewith upwards, such that the upper collets 9 and the lower collets 6 disengage with each other.

Embodiment 2

The embodiment discloses a shape-restoring method for distorted filmstrips that employs the shape-restoring device as mentioned above, which comprises the following steps.

Step 1: pressuring. The air compressor is started, and the diverter valves are pressured to 0.6 MPa.

Step 2: heating. The heating panel 17 is heated by the heating resistors 18 to 80° C., and is maintained at this temperature.

Step 3: fixing filmstrips. The distorted filmstrip is located on the film-unwinding reel 11 at one side of the shape-restoring device for distorted filmstrips, and a segment of the distorted filmstrip is placed on the heating panel 17. The ports of the second three-way valve and of the third three-way valve that are connected to upper inlets of the first film-clasping cylinder 16 and of the second film-clasping cylinder 10 are opened, such that pressure is introduced into the first film-clasping cylinder 16 and second film-clasping cylinder 10. Hence, the first film-clasping cylinder 16 and the second film-clasping cylinder 10 generate a downward pressure. Under the action of the downward pressure, the first film-clasping cylinder 16 and the second film-clasping cylinder 10 move the upper collets 9 fixedly connected therewith downwards, such that the upper collets 9 engage with the lower collets 6 and the filmstrip is tightly fixed. During fixing the filmstrip, the port of the second three-way valve that is connected with the upper inlet of the first film-clasping cylinder 16 is opened, and the first film-clasping cylinder 16 is started so as to tightly fix one end of the filmstrip first and then tense the filmstrip; and then the port of the third three-way valve that is connected with the upper inlet of the second film-clasping cylinder 10 is opened, and the second film-clasping cylinder 10 is started so as to tightly fix the other end of the filmstrip.

Step 4: shape-restoring distorted filmstrips. The first diverter valve is opened, such that pressure is introduced into the first pressing-plate cylinder 3 and second pressing-plate cylinder 4 while passing through the first diverter valve, such that the first pressing-plate cylinder 3 and second pressing-plate cylinder 4 simultaneously generate a downward pressure. Under the action of the downward pressure, the cylinder spindles of the first pressing-plate cylinder 3 and of the second pressing-plate cylinder 4 move the pressing plate 14 fixedly connected therewith downwards, such that the binding underlay 15 on the lower surface of the pressing plate 14 closely contacts the heating panel 17. Hence the distorted filmstrip is pressured and heated, and therefore is restored. In this embodiment, shape-restoring is performed at 80° C. and 0.5 MPa. The time for restoring lasts 80 s. In this way a well restored filmstrip segment would result.

Step 5: transporting filmstrips. Upon finishing resorting, the first diverter valve is closed and the second diverter valve is opened, such that pressure is introduced into the first pressing-plate cylinder 3 and the second pressing-plate cylinder 4 while passing through the second diverter valve. Hence the first pressing-plate cylinder 3 and the second pressing-plate cylinder 4 generate an upward pressure simultaneously. Under the action of the upward pressure, the cylinder spindles of the first pressing-plate cylinder 3 and of the second pressing-plate cylinder 4 move the pressing plate 14 fixedly connected therewith upwards, such that the binding underlay 15 on the lower surface of the pressing plate 14 disengages with the heating panel 17. The ports of the second three-way valve and of the third three-way valve that are connected with the lower inlets of the first film-clasping cylinder 16 and of the second film-clasping cylinder 10 are opened, such that the pressure is introduced into the first film-clasping cylinder 16 and the second film-clasping cylinder 10. In this way, the first film-clasping cylinder 16 and the second film-clasping cylinder 10 generate an upward pressure simultaneously. Under the action of the upward pressure, the cylinder spindles of the first film-clasping cylinder 16 and of the second film-clasping cylinder 10 move the upper collets 9 fixedly connected therewith upwards, such that the upper collets 9 and the lower collets 6 disengage with each other. The restored filmstrip segment is wound to the film-winding reel 21, and then another filmstrip segment to be restored is loaded on the heating panel 17.

Step 6: shape-restoring filmstrips segment by segment. Steps 3 to 5 are repeated, and the distorted filmstrips are restored segment by segment. Well restored filmstrips would result.

Embodiment 3

The embodiment discloses a shape-restoring method for distorted filmstrips that employs the shape-restoring device as mentioned above, which comprises the following steps.

Step 1: pressuring. The air compressor is started, and the diverter valves are pressured to 0.7 MPa.

Step 2: heating. The heating panel 17 is heated by the heating resistors 18 to 83° C., and is maintained at this temperature.

Step 3: fixing filmstrips. The distorted filmstrip is located on the film-unwinding reel 11 at one side of the shape-restoring device for distorted filmstrips, and a segment of the distorted filmstrip is placed on the heating panel 17. The ports of the second three-way valve and of the third three-way valve that are connected to upper inlets of the first film-clasping cylinder 16 and of the second film-clasping cylinder 10 are opened, such that pressure is introduced into the first film-clasping cylinder 16 and second film-clasping cylinder 10. Hence, the first film-clasping cylinder 16 and the second film-clasping cylinder 10 generate a downward pressure. Under the action of the downward pressure, the first film-clasping cylinder 16 and the second film-clasping cylinder 10 move the upper collets 9 fixedly connected therewith downwards, such that the upper collets 9 engage with the lower collets 6 and the filmstrip is tightly fixed. When fixing the filmstrip, the port of the second three-way valve that is connected with the upper inlet of the first film-clasping cylinder 16 is opened, and the first film-clasping cylinder 16 is started so as to tightly fix one end of the filmstrip and then tense the filmstrip; and then the port of the third three-way valve that is connected with the upper inlet of the second film-clasping cylinder 10 is opened, and the second film-clasping cylinder 10 is started so as to tightly fix the other end of the filmstrip.

Step 4: shape-restoring distorted filmstrips. The first diverter valve is opened, such that pressure is introduced into the first pressing-plate cylinder 3 and second pressing-plate cylinder 4 while passing through the first diverter valve, such that the first pressing-plate cylinder 3 and second pressing-plate cylinder 4 simultaneously generate a downward pressure. Under the action of the downward pressure, the cylinder spindles of the first pressing-plate cylinder 3 and of the second pressing-plate cylinder 4 move the pressing plate 14 fixedly connected therewith downwards, such that the binding underlay 15 on the lower surface of the pressing plate 14 closely contacts the heating panel 17. Hence the distorted filmstrip is pressured and heated, and therefore is restored. In this embodiment, shape-restoring is performed at 83° C. and 0.6 MPa. The time for restoring lasts 70 s. In this way a well restored filmstrip would result.

Step 5: transporting filmstrips. Upon finishing resorting, the first diverter valve is closed and the second diverter valve is opened, such that pressure is introduced into the first pressing-plate cylinder 3 and the second pressing-plate cylinder 4 while passing through the second diverter valve. Hence the first pressing-plate cylinder 3 and the second pressing-plate cylinder 4 generate an upward pressure simultaneously. Under the action of the upward pressure, the cylinder spindles of the first pressing-plate cylinder 3 and of the second pressing-plate cylinder 4 move the pressing plate 14 fixedly connected therewith upwards, such that the binding underlay 15 on the lower surface of the pressing plate 14 disengages with the heating panel 17. The ports of the second three-way valve and of the third three-way valve that are connected with the lower inlets of the first film-clasping cylinder 16 and of the second film-clasping cylinder 10 are opened, such that pressure is introduced into the first film-clasping cylinder 16 and the second film-clasping cylinder 10 simultaneously. In this way, the first film-clasping cylinder 16 and the second film-clasping cylinder 10 generate an upward pressure simultaneously. Under the action of the upward pressure, the cylinder spindles of the first film-clasping cylinder 16 and of the second film-clasping cylinder 10 move the upper collets 9 fixedly connected therewith upwards, such that the upper collets 9 and the lower collets 6 disengage with each other. The restored filmstrip segment is wound to the film-winding reel 21, and then another filmstrip segment to be restored is loaded on the heating panel 17.

Step 6: shape-restoring filmstrips segment by segment. Steps 3 to 5 are repeated, and the distorted filmstrips are restored segment by segment. Well restored filmstrips would result.

Embodiment 4

The embodiment discloses a shape-restoring method for distorted filmstrips that employs the shape-restoring device as mentioned above, which comprises the following steps.

Step 1: pressuring. The air compressor is started, and the diverter valves are pressured to 0.8 MPa.

Step 2: heating. The heating panel 17 is heated by the heating resistors 18 to 85° C., and is maintained at this temperature.

Step 3: fixing filmstrips. The distorted filmstrip is located on the film-unwinding reel 11 at one side of the shape-restoring device for distorted filmstrips, and a segment of the distorted filmstrip is placed on the heating panel 17. The ports of the second three-way valve and of the third three-way valve that are connected to upper inlets of the first film-clasping cylinder 16 and of the second film-clasping cylinder 10 are opened, such that pressure is introduced into the first film-clasping cylinder 16 and second film-clasping cylinder 10. Hence, the first film-clasping cylinder 16 and the second film-clasping cylinder 10 generate a downward pressure simultaneously. Under the action of the downward pressure, the first film-clasping cylinder 16 and the second film-clasping cylinder 10 move the upper collets 9 fixedly connected therewith downwards, such that the upper collets 9 engage with the lower collets 6 and the filmstrip is tightly fixed. When fixing the filmstrip, the port of the second three-way valve that is connected with the upper inlet of the first film-clasping cylinder 16 is opened, and the first film-clasping cylinder 16 is started so as to tightly fix one end of the filmstrip and then tense the filmstrip; and then the port of the third three-way valve that is connected with the upper inlet of the second film-clasping cylinder 10 is opened, and the second film-clasping cylinder 10 is started so as to tightly fix the other end of the filmstrip.

Step 4: shape-restoring distorted filmstrips. The first diverter valve is opened, such that pressure is introduced into the first pressing-plate cylinder 3 and second pressing-plate cylinder 4 while passing through the first diverter valve, such that the first pressing-plate cylinder 3 and second pressing-plate cylinder 4 simultaneously generate a downward pressure. Under the action of the downward pressure, the cylinder spindles of the first pressing-plate cylinder 3 and of the second pressing-plate cylinder 4 move the pressing plate 14 fixedly connected therewith downwards, such that the binding underlay 15 on the lower surface of the pressing plate 14 closely contacts the heating panel 17. Hence the distorted filmstrip is pressured and heated, and therefore is restored. In this embodiment, shape-restoring is performed at 85° C. and 0.7 MPa. The time for restoring lasts 60 s. In this way a well restored filmstrip would result.

Step 5: transporting filmstrips. Upon finishing resorting, the first diverter valve is closed and the second diverter valve is opened, such that pressure is introduced into the first pressing-plate cylinder 3 and the second pressing-plate cylinder 4 while passing through the second diverter valve. Hence the first pressing-plate cylinder 3 and the second pressing-plate cylinder 4 generate an upward pressure simultaneously. Under the action of the upward pressure, the cylinder spindles of the first pressing-plate cylinder 3 and of the second pressing-plate cylinder 4 move the pressing plate 14 fixedly connected therewith upwards, such that the binding underlay 15 on the lower surface of the pressing plate 14 disengages with the heating panel 17. The ports of the second three-way valve and of the third three-way valve that are connected with the lower inlets of the first film-clasping cylinder 16 and of the second film-clasping cylinder 10 are opened, such that pressure is introduced into the first film-clasping cylinder 16 and the second film-clasping cylinder 10 simultaneously. In this way, the first film-clasping cylinder 16 and the second film-clasping cylinder 10 generate an upward pressure simultaneously. Under the action of the upward pressure, the cylinder spindles of the first film-clasping cylinder 16 and of the second film-clasping cylinder 10 move the upper collets 9 fixedly connected therewith upwards, such that the upper collets 9 and the lower collets 6 disengage with each other. The restored filmstrip segment is wound to the film-winding reel 21, and then another filmstrip segment to be restored is loaded on the heating panel 17.

Step 6: shape-restoring filmstrips segment by segment. Steps 3 to 5 are repeated, and the distorted filmstrips are restored segment by segment. Well restored filmstrips would result.

Embodiment 5

The embodiment discloses a shape-restoring method for distorted filmstrips that employs the shape-restoring device, which comprises the following steps.

Step 1: pressuring. The air compressor is started, and the diverter valves are pressured to 0.9 MPa.

Step 2: heating. The heating panel 17 is heated by the heating resistors 18 to 90° C., and is maintained at this temperature.

Step 3: fixing filmstrips. The distorted filmstrip is located on the film-unwinding reel 11 at one side of the shape-restoring device for distorted filmstrips, and a segment of the distorted filmstrip is placed on the heating panel 17. The ports of the second three-way valve and of the third three-way valve that are connected to upper inlets of the first film-clasping cylinder 16 and of the second film-clasping cylinder 10 are opened, such that pressure is introduced into the first film-clasping cylinder 16 and second film-clasping cylinder 10 respectively. Hence, the first film-clasping cylinder 16 and the second film-clasping cylinder 10 generate a downward pressure respectively. Under the action of the downward pressure, the first film-clasping cylinder 16 and the second film-clasping cylinder 10 move the upper collets 9 fixedly connected therewith downwards, such that the upper collets 9 engage with the lower collets 6 and the filmstrip is tightly fixed. When fixing the filmstrip, the port of the second three-way valve that is connected with the upper inlet of the first film-clasping cylinder 16 is opened, and the first film-clasping cylinder 16 is started so as to tightly fix one end of the filmstrip and then tense the filmstrip; and then the port of the third three-way valve that is connected with the upper inlet of the second film-clasping cylinder 10 is opened, and the second film-clasping cylinder 10 is started so as to tightly fix the other end of the filmstrip.

Step 4: shape-restoring distorted filmstrips. The first diverter valve is opened, such that pressure is introduced into the first pressing-plate cylinder 3 and second pressing-plate cylinder 4 while passing through the first diverter valve, such that the first pressing-plate cylinder 3 and second pressing-plate cylinder 4 simultaneously generate a downward pressure. Under the action of the downward pressure, the cylinder spindles of the first pressing-plate cylinder 3 and of the second pressing-plate cylinder 4 move the pressing plate 14 fixedly connected therewith downwards, such that the binding underlay 15 on the lower surface of the pressing plate 14 closely contacts the heating panel 17. Hence the distorted filmstrip is pressured and heated, and therefore is restored. In this embodiment, shape-restoring is performed at 90° C. and 0.8 MPa. The time for restoring lasts 50 s. In this way a well restored filmstrip would result.

Step 5: transporting filmstrips. Upon finishing resorting, the first diverter valve is closed and the second diverter valve is opened, such that pressure is introduced into the first pressing-plate cylinder 3 and the second pressing-plate cylinder 4 while passing through the second diverter valve. Hence the first pressing-plate cylinder 3 and the second pressing-plate cylinder 4 generate an upward pressure simultaneously. Under the action of the upward pressure, the cylinder spindles of the first pressing-plate cylinder 3 and of the second pressing-plate cylinder 4 move the pressing plate 14 fixedly connected therewith upwards, such that the binding underlay 15 on the lower surface of the pressing plate 14 disengages with the heating panel 17. The ports of the second three-way valve and of the third three-way valve that are connected with the lower inlets of the first film-clasping cylinder 16 and of the second film-clasping cylinder 10 are opened, such that pressure is introduced into the first film-clasping cylinder 16 and the second film-clasping cylinder 10 simultaneously. In this way, the first film-clasping cylinder 16 and the second film-clasping cylinder 10 generate an upward pressure simultaneously. Under the action of the upward pressure, the cylinder spindles of the first film-clasping cylinder 16 and of the second film-clasping cylinder 10 move the upper collets 9 fixedly connected therewith upwards, such that the upper collets 9 and the lower collets 6 disengage with each other. The restored filmstrip segment is wound to the film-winding reel 21, and then another filmstrip segment to be restored is loaded on the heating panel 17.

Step 6: shape-restoring filmstrips segment by segment. Steps 3 to 5 are repeated, and the distorted filmstrips are restored segment by segment. Well restored filmstrips would result.

What is claimed is:

1. A shape-restoring device for distorted filmstrips, comprising: a bracket, a base, a first pressing-plate cylinder, a second pressing-plate cylinder, a pressing plate, a heating panel, heating resistors, a temperature sensor, a film-unwinding reel, a film-winding reel, a hanging rack, a bottom plate, a first film-clasping cylinder, and a second film-clasping cylinder, wherein a) the bracket is fixed on an upper surface of the base to form a frame structure; the first pressing-plate cylinder and the second pressing-plate cylinder are installed on a crossbeam of the bracket; cylinder spindles of the first pressing-plate cylinder and of the second pressing-plate cylinder pass through the crossbeam and are fixedly connected to connecting rods of the hanging rack in the frame, the frame including the bracket and the base; the heating panel and the pressing plate are located within the frame, the frame including the bracket and the base, and the heating panel is installed on the upper surface of the base; the pressing plate is fixed on a lower surface of the hanging rack; the pressing plate having a binding underlay on a lower surface thereof; an upper surface of the pressing plate is fixed with a limiting sleeve on each side thereof, respectively; positioning spindles are fixed to the crossbeam of the bracket at respective ends thereof, and the other ends thereof are telescoped within respective ones of the limiting sleeves; and the film-unwinding reel is located on one side of the base and the film-winding reel is located on another side of the base;

b) the first film-clasping cylinder and the second film-clasping cylinder are fixed to outer surfaces of end wall plates of the bracket; spindles of the first film-clasping cylinder and of the second film-clasping cylinder are connected with upper collets, which correspond, in of location, to lower collets that are fixed beneath the first film-clasping cylinder and the second film-clasping cylinder; surfaces of the upper collets and of the lower collets include arcs that match with each other; the surfaces of both lower collets are located in substantially a same height as an upper surface of the heating panel; and c) the heating panel is provided with installing grooves for the heating resistors on a lower surface thereof; and the heating resistors are uniformly distributed on the lower surface of the heating panel; some of the heating resistors are in circuit with respective temperature sensors.

2. The shape-restoring device according to claim 1, wherein the bottom plate is sandwiched between the heating panel and the base.

3. The shape-restoring device according to claim 1, wherein the base is fixed with a supporting plate on each side of an upper surface thereof; the film-unwinding reel and the film-winding reel are fixed on a lower surface of the supporting plate respectively; the upper collets are also fixed on an upper surface of the supporting plate respectively.

4. The shape-restoring device according to claim 1, wherein each of the positioning spindles is respectively provided with a limiting bar on an inner side thereof; the first pressing-plate cylinder and the second pressing-plate cylinder are respectively located on the inner sides of the limiting bars; the bracket is fixed with the first film-clasping cylinder and the second film-clasping cylinder on the outer surfaces of the end wall plates thereof respectively.

5. The shape-restoring device according to claim 1, wherein an air compressor is connected with a first three-way valve, a second three-way valve, and a third three-way valve respectively; two ports of the first three-way valve are connected to inlets of a first diverter valve and of a second diverter valve, respectively; two ports of the first diverter valve are connected to upper inlets of the first pressing-plate cylinder and of the second pressing-plate cylinder, respectively; two ports of the second diverter valve are connected to lower inlets of the first pressing-plate cylinder and of the second pressing-plate cylinder, respectively; two ports of the second three-way valve are connected to the upper and lower inlets of the first film-clasping cylinder, respectively; two ports of the third three-way valve are connected to the upper and the lower inlets of the second film-clasping cylinder, respectively.

\* \* \* \* \*